United States Patent
Lang et al.

(10) Patent No.: US 9,888,065 B2
(45) Date of Patent: Feb. 6, 2018

(54) DEFRAGMENTING CLUSTERS WITH RESERVED RESOURCES

(71) Applicant: MICROSOFT TECHNOLOGY LICENSING, LLC, Redmond, WA (US)

(72) Inventors: Willis Lang, Madison, WI (US); Nikhil Teletia, Madison, WI (US); Ajay Kalhan, Redmond, WA (US); Alan Dale Halverson, Verona, WI (US); Prashant Varanasi, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/155,295

(22) Filed: May 16, 2016

(65) Prior Publication Data
US 2016/0261687 A1  Sep. 8, 2016

Related U.S. Application Data

(63) Continuation of application No. 13/910,312, filed on Jun. 5, 2013, now Pat. No. 9,350,800.

(51) Int. Cl.
*G06F 15/173* (2006.01)
*H04L 29/08* (2006.01)
(Continued)

(52) U.S. Cl.
CPC .......... *H04L 67/1008* (2013.01); *H04L 47/70* (2013.01); *H04L 67/1002* (2013.01);
(Continued)

(58) Field of Classification Search
CPC . H04L 67/1008; H04L 47/70; H04L 67/1002; H04L 67/0176; H04L 67/1031; H04L 67/108; H04L 67/34
(Continued)

(56) References Cited

U.S. PATENT DOCUMENTS 6,463,454 B1 * 10/2002 Lumelsky ............. G06F 9/5083
  707/E17.12
7,272,613 B2   9/2007 Sim et al.
(Continued)

OTHER PUBLICATIONS

"Final Office Action Issued in U.S. Appl. No. 13/910,312", dated Sep. 18, 2015, 9 Pages. (MS# 338935.01).
(Continued)

*Primary Examiner* — Kristie Shingles
(74) *Attorney, Agent, or Firm* — Workman Nydegger

(57) ABSTRACT

Defragmenting a cluster service to service additional capacity requests on the service. A method includes determining an amount of server resources needed for an additional deployment reservation request for a new deployment or increasing reservation of resources of an existing deployment. The method further includes determining a server that currently does not have capacity to service the additional deployment reservation request. The method further includes determining how resources on the server can be freed up by moving other replicas of other deployments on the server to other servers to allow the server to service the additional deployment reservation request.

20 Claims, 6 Drawing Sheets

(51) Int. Cl.
*H04L 29/14* (2006.01)
*H04L 12/911* (2013.01)

(52) U.S. Cl.
CPC ........ *H04L 67/108* (2013.01); *H04L 67/1031* (2013.01); *H04L 67/1076* (2013.01); *H04L 67/34* (2013.01); *H04L 69/40* (2013.01)

(58) Field of Classification Search
USPC .......................................................... 709/226
See application file for complete search history.

(56) References Cited

U.S. PATENT DOCUMENTS

| | | | | |
|---|---|---|---|---|
| 8,510,590 | B2 * | 8/2013 | Ji ........................ | G06F 11/1438 714/3 |
| 8,694,400 | B1 * | 4/2014 | Certain ................. | G06Q 30/08 705/26.3 |
| 8,874,749 | B1 * | 10/2014 | Vittal ........................... | 709/226 |
| 2005/0021201 | A1 * | 1/2005 | Klotz ................... | B60W 30/16 702/189 |
| 2005/0021501 | A1 | 1/2005 | Butron | |
| 2011/0138051 | A1 | 6/2011 | Dawson et al. | |
| 2011/0225299 | A1 | 9/2011 | Nathuji et al. | |
| 2011/0296052 | A1 * | 12/2011 | Guo ..................... | G06F 9/5077 709/240 |
| 2012/0011518 | A1 | 1/2012 | Duan et al. | |
| 2012/0089726 | A1 | 4/2012 | Doddavula | |
| 2012/0131594 | A1 | 5/2012 | Morgan | |
| 2012/0137001 | A1 | 5/2012 | Ferris et al. | |
| 2012/0284408 | A1 | 11/2012 | Dutta et al. | |
| 2014/0059379 | A1 * | 2/2014 | Ren ........................ | G06F 11/08 714/15 |
| 2015/0070585 | A1 * | 3/2015 | Sharif-Ahmadi ...... | G08C 17/02 348/564 |

OTHER PUBLICATIONS

"Non-Final Office Action Issued in U.S. Appl. No. 13/910,312", dated Apr. 10, 2015, 8 Pages. (MS# 338935.01).

"Notice of Allowance Issued in U.S. Appl. No. 13/910,312", dated Feb. 24, 2016, 9 Pages. (MS# 338935.01).

Garg, et al., "SLA-Based Resource Provisioning for Heterogeneous Workloads in a Virtualized Cloud Datacenter", In Proceedings of the 11th International Conference on Algorithms and Architectures for Parallel Processing—vol. Part 1, Oct. 24, 2011, 14 Pages.

Goudarzi, et al., "Multi-Dimensional SLA-based Resource Allocation for Multi-tier Cloud Computing Systems", In IEEE 4th International Conference on Cloud Computing, Jul. 4, 2011, 8 Pages.

Iqbal, et al., "SLA-Driven Dynamic Resource Management for Multi-Tier Web Applications in a Cloud", In IEEE 10th International Conference on Cluster, Cloud and Grid Computing, May 17, 2010, 6 Pages.

* cited by examiner

DEFRAGMENTING CLUSTERS WITH RESERVED RESOURCES

CROSS-REFERENCE TO RELATED APPLICATIONS

This application is a continuation of U.S. patent application Ser. No. 13/910,312 filed on Jun. 5, 2013, entitled "DEFRAGMENTING CLUSTERS WITH RESERVED RESOURCES," which issued as U.S. Pat. No. 9,350,800 on May 24, 2016, and which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

To achieve the goal of predictable performance for all customers of a cloud server, mechanisms are used to control the amount of resources that each cloud customer can use. Without such mechanisms, starvation (unfairness) can occur since computing resources like CPU cycles are provided to all customers in a free-for-all manner. In some cloud environments, customers will be able to subscribe to specific Service-Level-Objectives (SLOs) that provide exclusive reservations on resources like CPU cores and worker threads. To simplify these products, there are only a small number of SLO "sizes" that customers can choose from.

For example, a "small" SLO provides ½ a CPU core, "medium" provides 1 CPU core, "large" provides 2 CPU cores, "xlarge" provides 4 CPU cores, and "xxlarge" reserves the entire server (logically 8 cores—although other processes exist and also use cores). Additional resources such as worker threads, memory, and disk IOs can be reserved in proportion to the CPU core SLO definitions. Going from any SLO size up to the next higher size will double the number of worker threads).

An xxlarge SLO customer occupies an entire server (continuing the running example above). As each SLO resource reservation is scaled in multiples of each other, embodiments can guarantee that a homogeneous placement of the same SLO size in a server will fill the server perfectly.

However, when there is heterogeneous placement of SLOs on a server, embodiments may end up with "holes" in the server that correspond to unallocated resources on the server that can't be used to "fit" a specific new tenant. For example, if a server has a "small" tenant and a new xxlarge tenant arrives that requires the entire server, then this new tenant can't be placed on the current server. This situation may be repeated, in different ways, with other tenants and servers in the cluster. The result is underutilization and poor cost of goods and services as embodiments may end up needing to provision more servers than necessary.

Furthermore, accommodating elasticity and dynamicity in cloud environments, such as SQL Azure™ may require that embodiments intentionally leave resource space for new customers and/or changes in the SLO size of existing tenants (e.g., an existing tenant upgrading from small to a medium SLO size).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment. The method includes acts for defragmenting a cluster service to service additional capacity requests on the service. The method includes determining an amount of server resources needed for an additional deployment reservation request for a new deployment or increasing reservation of resources of an existing deployment. The method further includes determining a server that currently does not have capacity to service the additional deployment reservation request. The method further includes determining how resources on the server can be freed up by moving other replicas of other deployments on the server to other servers to allow the server to service the additional deployment reservation request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may include functionality for performing defragmentation when customers request reservations of resources for new deployments on a cluster (e.g. cloud) service or when customers request a larger reservation of resources for additional capacity for an existing deployment. In both situations, embodiments need to free-up and consolidate pockets of free computing resource capacity so that embodiments can optimize deployments to optimize reservations of computing resources.

Some embodiments may implement an offline software tool and method to create Service Level Objective (SLO) capacity in a Database as a Service (DaaS) cluster environment. Embodiments may provide a software framework to determine a set of actions (movement of customer deployments, including customer data and reservations of resources) such that embodiments can consolidate and free-up unused cluster capacity (in terms of computing resources) for additional customers. Doing so allows embodiments to decrease the costs incurred per customer while still providing computing resource reservation guarantees.

Embodiments may include, for example, a method of determining how to move customers' (that have paid for computing resource reservations) databases around in the cluster so that embodiments can free-up and consolidate computing resources for new customers (that also pay for reservations) or customers that want to increase their reservation. Embodiments may include functionality for reducing the amount of time it takes to find a solution for deployment movements by 1) allowing users to bound the search time used to search for reservation movement solutions; and 2) pruning away various intermediate solutions by looking at the size and/or cost to move the customer's deployment, such as the cost to move data or the size of a reservation for a customer deployment. Embodiments may implement an offline software tool to determine the defragmentation (customer data movement) steps. As this problem can take a lot of CPU power and can take a long time, embodiments may want to be able to identify the resource movement steps on a machine external to the cluster service.

Figure 1:
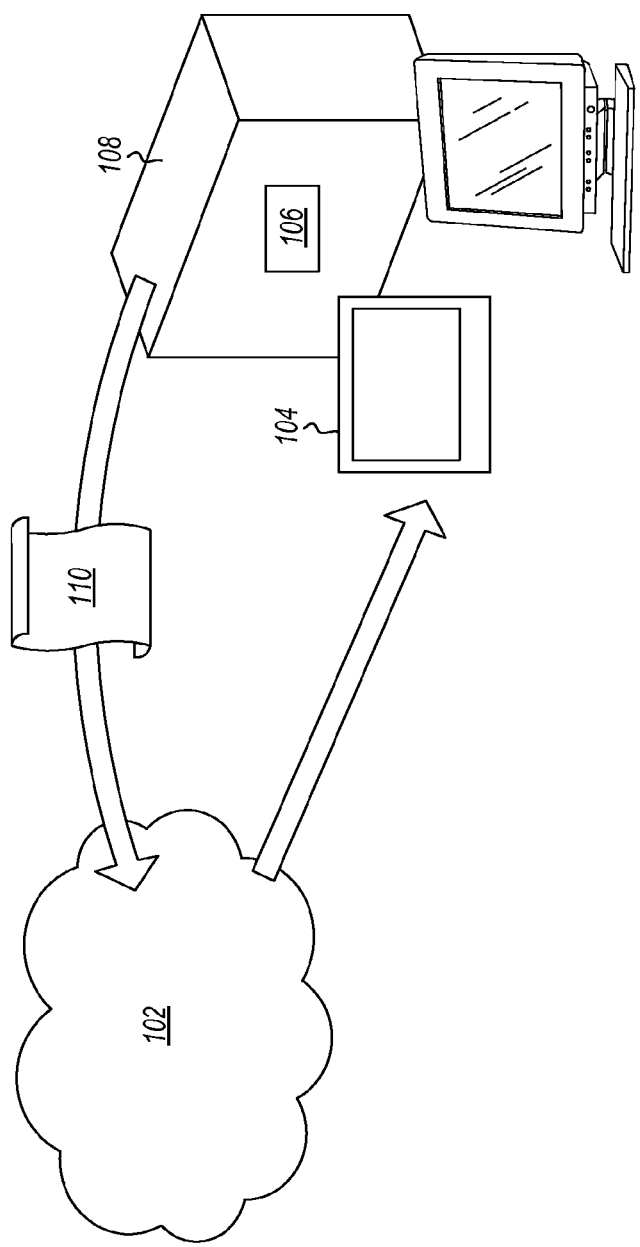
FIG. 1 illustrates an offline software tool that can be used to evaluate a cluster and customer deployments on the cluster.

With reference to FIG. 1, the following illustrates an example use of an offline tool that may be used in some embodiments. When a new customer wishes to pay for a computer resource reservation (SLO) in a cluster service such as SQL Azure™ available from Microsoft® Corporation of Redmond Wash., or when an existing customer wishes to upgrade their reservation, a cluster service operator first extracts a snapshot 104, such as in some embodiments an XML snapshot, of the cluster 102 in which the customer will be/is placed. This snapshot 104 contains a mapping of the existing SLO customer databases to the cluster servers (such as for example an XML document describing the mapping illustrated in FIG. 2 or FIG. 3A). With this snapshot, a cluster service operator can then feed these data to a defragment tool 106 on an external (to the cluster), computing system 108 that can be used offline to determine the actions necessary to accommodate the new/expanded customer request.

The following now illustrates details with respect to a defragmentation method for creating space to deploy a new deployment or to expand an existing deployment. An end user specifies the SLO requirement. For example, the user may specify the SLO size and how many replicas of each deployment are needed. For example, if a customer is requesting an xxlarge database with a typical redundancy requirement of three replicas per database then the SLO requirement will be three xxlarge replicas. The defragmentation algorithm is based on a recursive search for servers to provide the necessary three SLO replica spaces for a database request. Thus, for a 'k'-replica (for HA replication) SLO database request, embodiments will recurse 'k' levels deep in a search tree.

The algorithm performs exploration at three levels for each replica in an SLO database request: 1) source server selection, 2) replica selection, and 3) replica target server selection.

With respect to source server selection, given that embodiments have "n" number of servers in an SLO sub-cluster, embodiments could pick any of these servers to create the replica.

With respect to replica selection, a subset of the replicas hosted may be required to be moved off of the source server to create the required capacity space. For example, if the server with a total capacity of eight cores has three "medium" replicas hosted on it (meaning that there is still free capacity on this server for a "large" replica), then to create xlarge space (equal to two "large" spaces or four "medium" spaces), two of these three medium replicas should be moved out. There are three ways in which embodiments can pick a set of two replicas in this example: {1, 2, 3}=>{1, 2} {1, 3} {2, 3}

With respect to replica target server selection, given the SLO and fault domain and/or upgrade domain constraints, selected replicas may have a limited number of servers to which they could be moved. Fault domains and upgrade domains will be discussed in more detail below.

Once the requested space is created on a server, a recursive call is made to create space for the remaining replicas of the database request, in the case where multiple replicas are implemented for redundancy, until there are no more replicas left to be created. In some embodiments, the search space is explored depth first which means the memory utilization is bounded to the number of replicas (replication factor 'k') for a database request.

Figure 2:
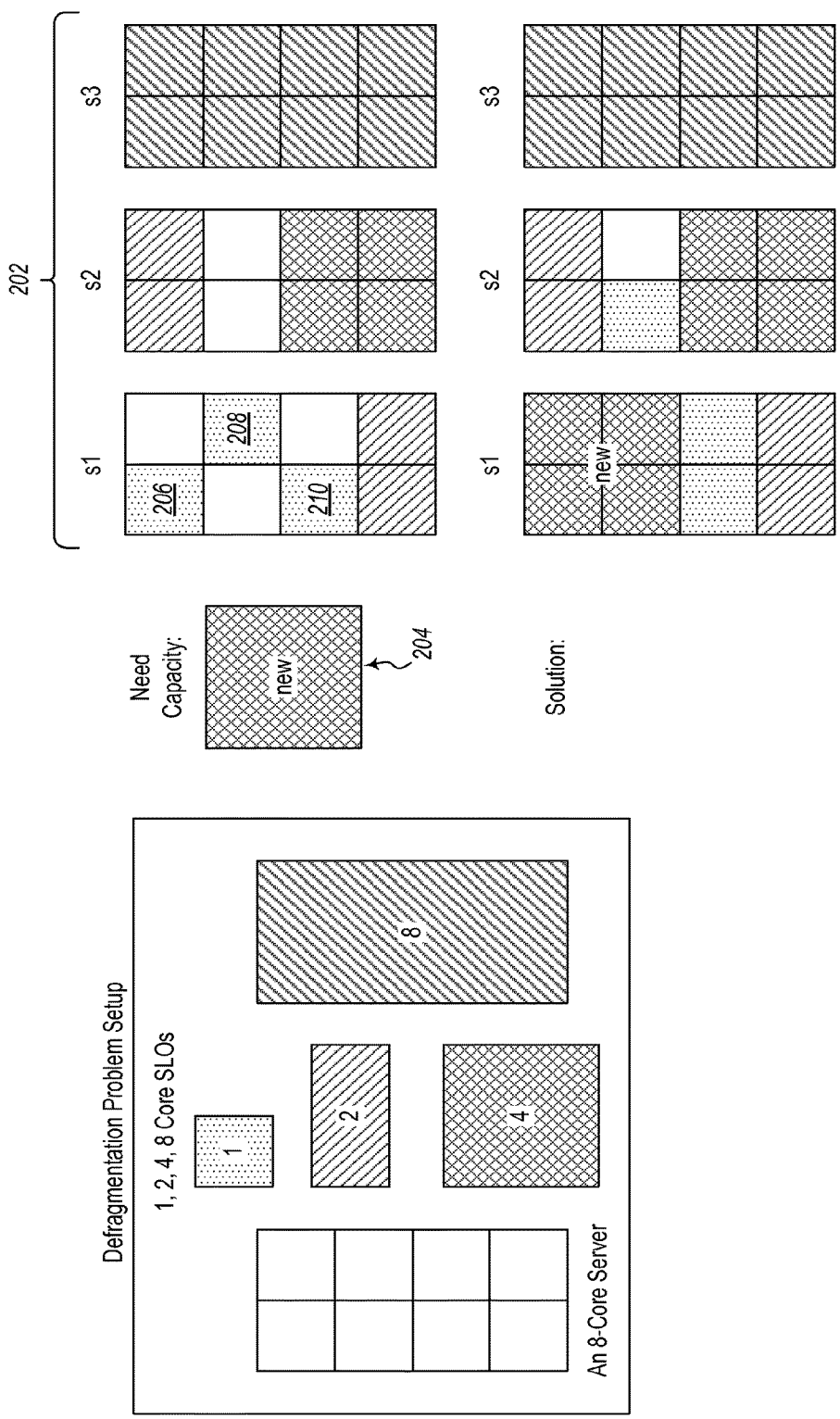
FIG. 2 illustrates an example cluster defragmentation scenario.

FIG. 2 illustrates a simple example, where a new deployment reservation 204 needing four cores (e.g. an xlarge single replica deployment) is to be deployed to a cluster 202 having three servers, s1, s2 and s3, each having total capacities of 8 cores. s1 has three single core (medium)

replicas and a double core (large) replica, leaving three cores available for new or expanded deployments. The server s2 has a double core replica and a quadruple core (xlarge) reservation, leaving two cores available for further reservations. The third server s3 has all 8 cores reserved by an eight core reservation.

Applying the principles above, for the source server selection, all the source server candidates (i.e. s1, s2 and s3 for this example) are sorted in descending order of free SLO capacity. Thus, the servers are sorted in the order shown, namely s1, s2 to s3. The server with the most capacity is selected. Thus, in this example, s1 is selected. While only a single replica is being illustrated, it should be appreciated that when multiple redundant replicas are attempting to be deployed, this step can be revisited and the order may be recalculated based on previous movements of deployments. Notably, on subsequent iterations to deploy other replicas, any previously selected server is excluded from selection. Thus, in the present example, s1 could not be selected for deploying another replica of the same reservation request. However, as discussed below, this may be prevented based on the fault domain for a deployment.

For replica-set selection, one or more replica sets are selected from the selected server (i.e. s1) such that moving the replica-set out would create sufficient space to host the SLO. In the example, illustrated, this may be accomplished by moving any one of replicas 206, 208 or 210, such that there would be four available cores for the new deployment 204. Embodiments may loop, in the off-line tool, over all three possible replica sets so as to be able to compare the costs of moving the different sets, such that an optimal selection can be accomplished. Embodiments may be able to apply cost based pruning to the explored possibilities. For example, if there exists a solution with a total page cost of 1000, then movement of any replica-set that exceeds this page cost could be pruned.

Illustrating now replica target server selection, for each replica to be moved, all the target server candidates are identified, observing upgrade domain and/or fault domain, and SLO capacity constraints. As each replica could be moved to multiple target servers (although not in the example illustrated in FIG. 2) embodiments may explore some or all the different permutations of target servers for all replicas in the replica-set selected in the replica-set selection to comply with various constraints. However, embodiments may be generally implemented where there is no cost based pruning here as embodiments assume the cost of moving a given set of replicas is the same regardless of the target.

Illustrating now additional details, for target server selection the servers can be ranked by least capacity to most capacity. This allows for efficient target server selection. In particular, the first target server in the ranked set, evaluated from least capacity to most capacity, with enough SLO capacity can be selected (subject to upgrade domain and/or fault domain requirements as discussed below) so as to efficiently use as much of the space on a server as possible rather than further fragmenting another server having substantially more than enough capacity to receive the replicas selected for movement.

As noted, a target server could be selected based on upgrade domains or fault domains. In particular, certain constraints will prevent some servers from being selected as a target server. For example, a fault domain is a set of components that represent a single point of failure. Thus, it may not be advisable to install two replicas of the same deployment on the same server or on different servers that are connected to the same power bar, or in some other configuration that creates an increased chance of failure. Additionally, embodiments may select servers based on upgrade domain considerations. An upgrade domain is a strategy to ensure an application stays up and running, while undergoing an update of the application. When possible, embodiments will distribute instances evenly into multiple upgrade domains with each upgrade domain as a logical unit of a deployment. When upgrading a deployment, it is then carried out one upgrade domain at a time. The steps are: stopping the instances running in the first upgrade domain, upgrading the application, bringing the instances back online followed by repeating the steps in the next upgrade domain. An upgrade is completed when all upgrade domains are processed. By stopping only the instances running within one upgrade domain, embodiments ensure that an upgrade takes place with the least possible impact to the running service. However, in the present example, s2 is the only replica with free capacity, and thus, s2 is selected.

As noted, when determining replica movement scenarios, embodiments may perform several different analyses and provide a user with a selection of different options, or may select the "cheapest" option for the user. As noted above, cheapest may be determined by the amount of data that needs to be moved, the amount of resources that need to be reserved, or other hardware, software, or data consideration.

However in some embodiments, in a first pass, embodiments may simply randomly or otherwise select a replica to move, and once a solution that allows replica movement and deployment to be accomplished, other options can be explored. In some embodiments, this may occur bottom up by stepping back to selections (either server selections or replica selections) made closest to the point where a viable solution is located. For example, if there are multiple target servers that could have been selected, after a solution is found, processing would step back to the target server selection step and select a different target server. However as noted, in some embodiments, this step may be skipped if it can be reasonably determined or assumed that the cost of moving to various target servers is the same. Processing could step back to replica selection if multiple different replicas could have been selected. A different replica could be selected to move to a target server to see if a viable solution could be achieved with the different replica selection. This can be repeated for other replicas until all replicas have been evaluated, a time limit has expired, or for other reasons. The different viable solutions that have been found could then be compared and an optimal (e.g. least cost) solution could be selected.

The off-line tool 106 may then create a deployment plan 110 (see FIG. 1) which could then be provided to the cluster 102 to defragment the cluster 102 to create space for the new or expanded deployment.

Figure 3A:
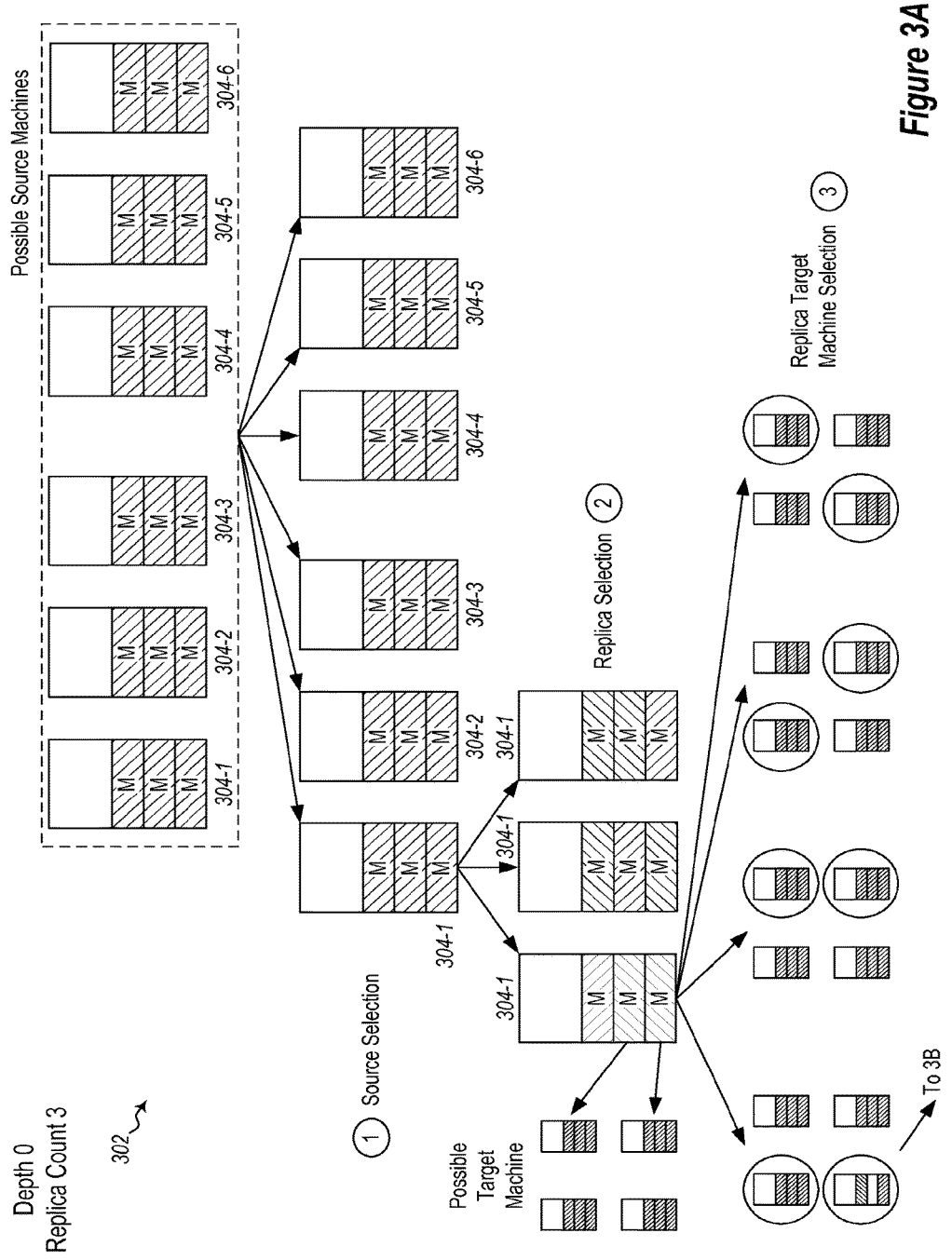
FIG. 3A illustrates an alternate cluster defragmentation scenario for a deployment having multiple replicas.
Figure 3B:
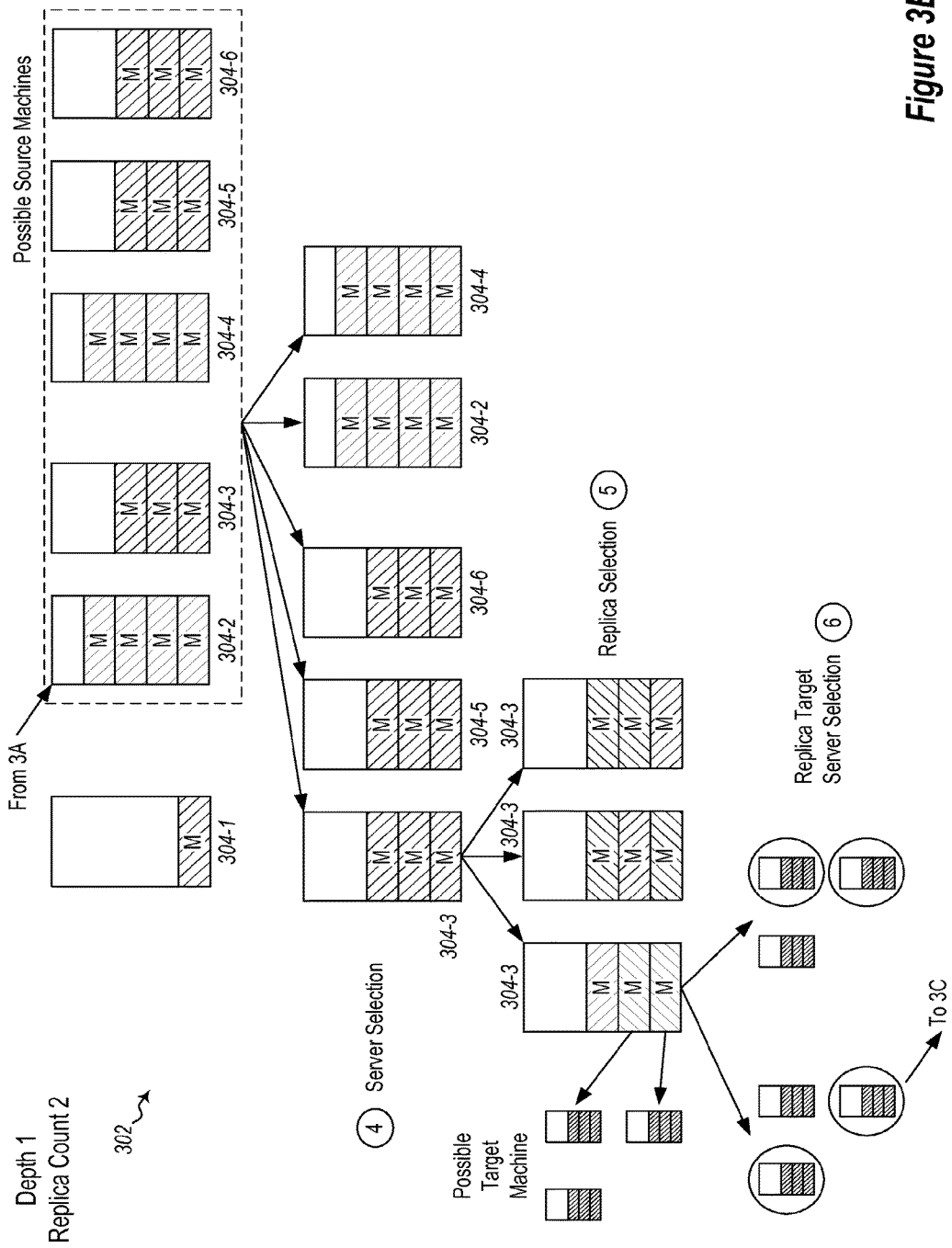
FIG. 3B illustrates additional details of the alternate cluster defragmentation scenario for a deployment having multiple replicas
Figure 3C:
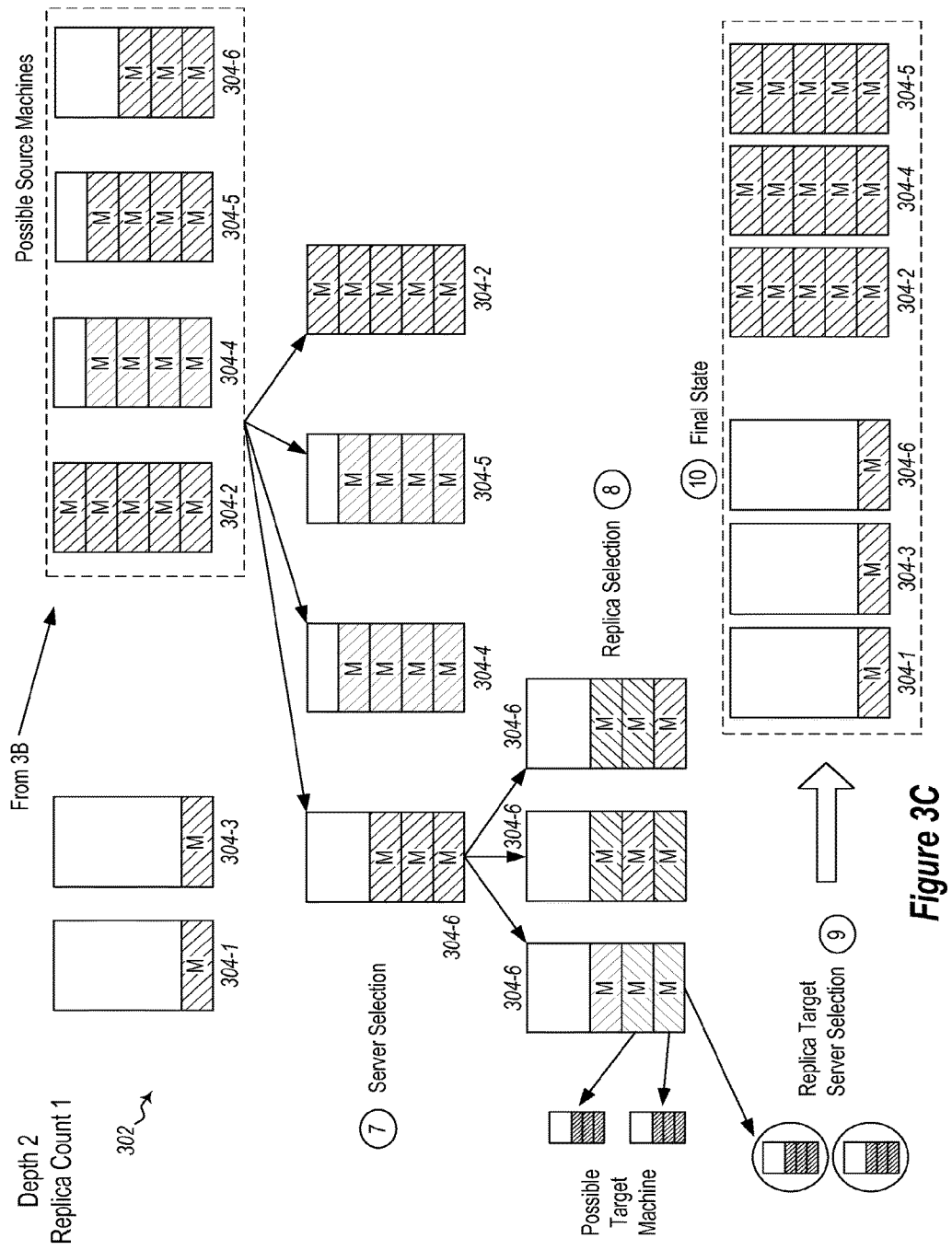
FIG. 3C illustrates additional details of the alternate cluster defragmentation scenario for a deployment having multiple replicas.

Referring now to FIGS. 3A-3C, a recursive example is illustrated showing resource exploration for a request of three "xlarge" replicas for a single "xlarge" database deployment on a six node SLO sub-cluster 302. The sub-cluster 302 is hosting six "medium" partitions each with three replicas each for a total of 18 "medium" replicas. The replicas are distributed uniformly across all six nodes 304-1, 304-2, 304-3, 304-4, 304-5, and 304-6. FIGS. 3A-3C illustrate three recursive calls (each recursive call is contained inside of one of FIGS. 3A-3C) and 10 steps are highlighted Referring now to FIG. 3A, the Depth 0 (Recursive Call 1) actions are illustrated. A recursive defragment algorithm is called with three xlarge replicas requested. As this is the first call, all servers 304-1 through 304-6 are potential candidates of being a source (where an xlarge replica slot can ultimately be provided).

Step 1 illustrates source server selection. As part of this step, all the source server candidates are sorted in descending order of free SLO capacity. (Note, in FIG. 3A, the sorting is not evident as all the servers have same free SLO capacity.) In the first iteration of this server selection loop, server 304-1 is picked as the next source and the execution is moved to the next loop level which is replica-set selection. Eventually, the execution will return back to this source server selection level and it will explore the space for the remaining five candidates (algorithm termination constraints permitting).

As illustrated at step 2, replica-set selection is performed. At this step, a replica-set is selected from the server 304-1 such that moving the replica-set out would create sufficient space to host the SLO ("xlarge" in the present example.) Two out of three "medium" replicas should be moved out to create "xlarge" space on server 304-1. There are three possible ways (as shown in FIG. 3A at step 2) in which a set of two replicas can be selected. At this point, embodiments can loop over three possible replica sets.

As embodiments have not found a solution, embodiments cannot apply cost-based pruning in this example at this point. However, embodiments could have applied a cost based pruning if a solution had been found. For example, if there exists a solution with a total page cost of 1000, then any replica-set that exceeds this page cost could be pruned. In the present example, one of the three possibilities is selected and processing moves to step 3. When the execution returns back to this loop over replica sets, it explores the space for the remaining two replica-sets (algorithm termination constraints permitting).

As illustrated at step 3, replica target server selection is illustrated. As part of this step, for each replica, all the target server candidates are identified, (observing upgrade domain/failure domain and SLO capacity constraints). This provides the third and final nested loop. As each replica could be moved to multiple target servers embodiments may select all the different permutations of target servers for all replicas in the replica-set selected in step 2. In this example, each replica has two target server candidates. This result in four possible placements for the replica set. Embodiments may pick one of the placements and generate reconfiguration operations and then make a recursive call while decreasing the number of SLO replica slots to create. Note that there is no pruning here, as it is assumed that the cost of moving a given set of replicas is the same regardless of the target. This, of course, is a simplification. The reconfiguration operations are applied on a clone of the cluster state (local to this call) and the new state is passed to next recursive call.

With reference now to FIG. 3B, Depth 1 (Recursive Call 2) details are illustrated to place the second replica of the deployment. The recursive defragment algorithm is called with a two "xlarge" replicas request. For this call, Server 304-1 can no longer be a potential candidate. Again, this is due to reconfiguration operations applied in the previous call. Furthermore, notice that server 304-2 and server 304-4 now host four "medium" replicas. Thus the order in which embodiments iterate over server selection has changed following sorting servers based on free capacity.

As illustrated at step 4, source server selection is illustrated. This step is similar to step 1. The sorting of candidate servers based on free SLO capacity is evident here. Based on the sorting, one branch of the depth first search will select Server 304-3.

As illustrated at step 5, replica-set selection is performed. This is step is similar to step 2. Server 304-3 hosts three "medium" replica and there are three different ways in which "xlarge" capacity could be created on Server 304-3.

As illustrated at step 6, replica target server selection is performed. This step is similar to step 3. Due to fewer target nodes, one of the two replicas that need to be moved has only one target server candidate which results in only two possible placements for the replica set. The loop iteration picks one of the placements and generates and applies the reconfiguration operations for this recursive call on a cloned cluster state. The new state is passed to next recursive call.

With reference now to FIG. 3C, Depth 2 (Recursive Call 3) details are illustrated to place the third replica of the deployment. The recursive defragment algorithm is called with an "xlarge" replica request. For this call, Server 304-1 and server 304-3 are no longer potential source server candidates. Due to reconfiguration operations applied in the previous calls, server 304-2 has five "medium" replicas servers 304-4 and 304-5 host four "medium" replicas.

As illustrated at step 7 sever selection, similar to step 1 and step 4 is performed. Server 304-6 is selected first for the first branch as it is the least loaded server.

As illustrated at step 8, replication selection, similar to step 2 and step 5 is performed. Server 304-6 hosts three "medium" replica and there are three different ways in which "xlarge" capacity could be created on Server 304-3.

As illustrated at step 9, replica target server selection, similar to step 3 and step 6 is performed. Due to fewer target nodes, replicas only have one target server candidate which results in only one possible placement for the replicas. Embodiments apply the reconfiguration operations and generate the final state, as illustrated at step 10.

As there are no replica requests left to be created, a solution is created. The solution includes the list of reconfiguration operations applied at each recursive call. The solution is added to a list of best solution found so far and the execution starts back-tracking and exploring the remaining solution space.

In the present example, as step 9 has only one alternative, the execution can backtrack to step 8 and select the remaining two replica-set selections to attempt to find other solutions. While not illustrated here, further backtracking could be performed to identify yet other solutions. The costs for these other solutions could be calculated so as to be able to determine lowest cost solutions.

Note that in some embodiments, the backtracking may be limited by time such that the best solution found within a particular period of time may be used. After the time has expired, the found solutions can be evaluated to determine a lowest cost solution. A "best" solution may be selected form the discovered solution by comparing cost, time to implement, or other factors.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
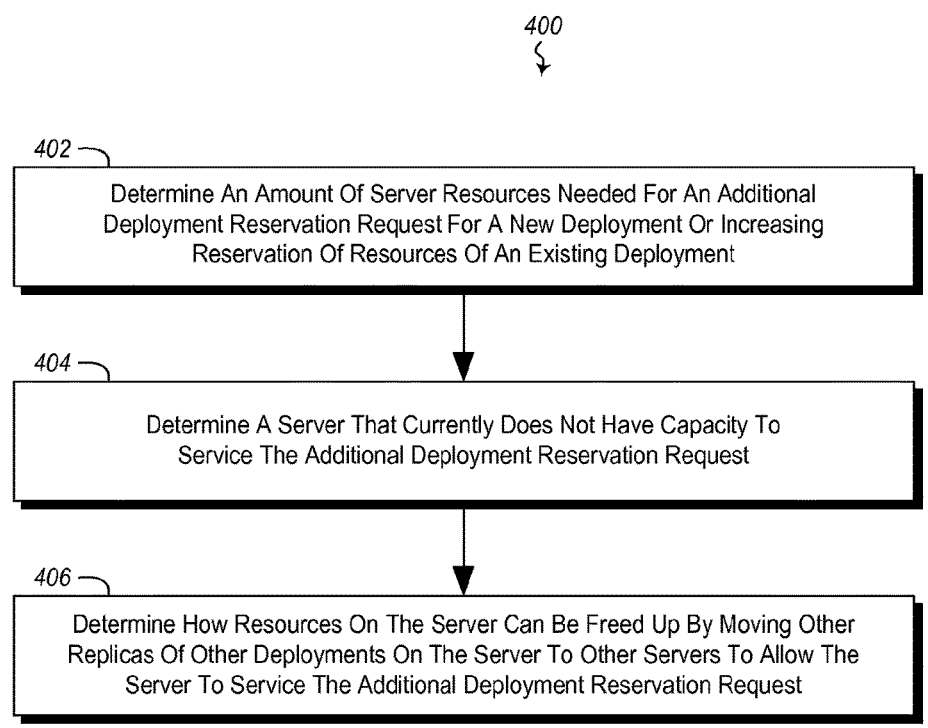
FIG. 4 illustrates a method of defragmenting a cluster service.

Referring now to FIG. 4, a method 400 is illustrated. The method 400 may be practiced in a distributed computing environment. The method includes acts for defragmenting a cluster service to service additional capacity requests on the service. The method 400 includes determining an amount of server resources needed for an additional deployment reservation request for a new deployment or increasing reservation of resources of an existing deployment (act 402). For example; a determination may be made as to how many processors or how much of other resources are needed to deploy a replica at a cluster service. In some embodiments, the determination may be made for a portion of the request. For example, if a deployment specifies several replicas of a resource, the determination may be made for a single replica of the deployment. However, the process may be repeated for other replicas.

The method 400 further includes determining a server that currently does not have capacity to service the additional deployment reservation request (act 404). As illustrated, above, this may be accomplished by finding a server for which replicas could be moved to free up space for the additional deployment request.

The method 400 further includes determining how resources on the server can be freed up by moving other replicas of other deployments on the server to other servers to allow the server to service the additional deployment reservation request (act 406). For example, FIG. 1 illustrates that moving any one of replicas 206, 208 or 210 would cause four cores to be available for the new deployment 204.

The method 400 may be practiced where the additional deployment reservation request is an upgrade request to reserve additional resources for an existing deployment. For example, rather than a new deployment being added, such as the new deployment 204 illustrated in FIG. 2, an existing deployment may be upgraded to use more resources of a server.

The method 400 may be practiced where the additional deployment reservation request is a new deployment request requesting a reservation of resources for a new deployment. An example of this is illustrated in FIG. 2 with respect to the deployment 204.

The method 400 may be practiced where determining that resources on the server can be freed up by moving other replicas of other deployments comprises following rules for a fault domain. For example, embodiments may determine that certain replicas cannot be moved to certain servers as it would result in single points of failure where two replicas of the same deployment are on the same server or on servers connected to the same power bar or in some other configuration that creates an increased chance of failure.

The method 400 may be practiced where determining that resources on the server can be freed up by moving other replicas of other deployments comprises following rules for an upgrade domain The method 400 may be practiced where determining a server that currently does not have capacity to service the additional capacity deployment request comprises ranking servers in a cluster by free capacity and selecting a server with the most free capacity. For example, as illustrated in FIG. 2, s1 has the most free capacity, s2 has the second most free capacity, and s3 has no free capacity. Alternative embodiments may rank servers by lowest cost to move replicas rather than most free capacity, or some other ranking.

The method 400 may further include determining one or more servers to which replicas from other deployments can be moved by ranking other servers by available capacity and determining to move a replica to the server with the least capacity that could fit the replica. Alternative embodiments may rank servers by cost or other factors.

The method 400 may further include determining a replica to move from the server by the cost of moving the replica as compared to the cost for moving other replicas. For example, in FIG. 2, if replica 206 is less costly to move (in terms of data movement, resource reconfiguration, etc.) than replicas 208 and 210, it will be selected to be moved. Cost may be determined by sizes of replicas (e.g. size of data or cores or some other resource calculation). Alternatively or additionally, cost may be determined by least number of replicas to move.

The method 400 may further include removing the server from further replica movement consideration based on already having determined to move resources from the server. For example in subsequent iterations to find servers for different replicas of a deployment, a server that has already been determined in a solution to have replicas moved, will not be considered as a candidate for additional replica movement to make room for other replicas.

The method 400 may further include taking a snapshot of a cluster environment, and wherein the steps of claim 1 are performed using the snapshot. This may be done in some embodiments so that the determination can be done offline from the cluster environment and once an optimal solution is determined, the solution can be uploaded to the cluster environment to allow the environment to perform the defragmentation.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer.

Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment, a method of defragmenting a cluster service to service additional capacity requests on the cluster service, the method comprising:
    ranking a plurality of servers in a cluster by currently available capacity;
    based at least on the ranking, selecting a first server with the most currently available capacity;
    identifying one or more replicas from the first server to move to a second server;
    determining the identity of the second server by at least identifying, from the ranking of the plurality of servers in the cluster, a server with a least currently available capacity that is sufficient to host the one or more identified replicas to be moved from the first server; and
    moving the one or more identified replicas from the first server to the second sever.

2. The method of claim 1, wherein the second server is determined to be on a different upgrade domain than the first server.

3. The method of claim 1, wherein the second server is determined to be on a different fault domain than the first server.

4. The method of claim 1, further comprising:
    determining to move a particular replica of the one or more replicas based at least on a cost of moving the particular replica as compared to the cost for moving at least one other replica.

5. The method of claim 4, wherein the cost is determined by at least one of (a) sizes of replicas or (b) at least a number of replicas to move.

6. The method of claim 1, further comprising: taking a snapshot of a cluster environment, and wherein the method is performed using the snapshot.

7. In a distributed computing environment, a system for defragmenting a cluster service to service additional capacity requests on the service, the system comprising:
    one or more processors; and
    one or more computer readable media, wherein the one or more computer readable media comprise computer executable instructions that when executed by at least one of the one or more processors cause at least one of the one or more processors to perform a method that includes the following:
        the system ranking a plurality of servers in a cluster by currently available capacity and, based at least on the ranking, selecting a first server with the most currently available capacity;
        the system identifying one or more replicas from the first server to move to a second server;
        the system determining the identity of the second server by at least identifying, from the ranking of the plurality of servers in the cluster, a server with a least currently available capacity that is sufficient to host the one or more identified replicas to be moved from the first server; and
        the system moving the one or more identified replicas from the first server to the second server.

8. The system of claim 7, wherein the second server is determined to be on a different upgrade domain than the first server.

9. The system of claim 7, wherein the second server is determined to be on a different fault domain than the first server.

10. The system of claim 7, wherein the method further includes:
    determining to move a particular replica of the one or more replicas based at least on a cost of moving the particular replica as compared to the cost for moving at least one other replica.

11. The system of claim 10, wherein the cost is determined by sizes of replicas.

12. The system of claim 10, wherein the cost is determined by at least a number of replicas to move.

13. The system of claim 7, wherein the method further includes: taking a snapshot of a cluster environment, and wherein the method is performed using the snapshot.

14. A hardware storage device storing computer executable instructions that are executable by one or more processors to cause the one or more processors to perform a defragmentation of servers in a cluster service by at least performing a method that includes the following:

ranking a plurality of servers in a cluster by currently available capacity;

based at least on the ranking, selecting a first server with the most currently available capacity;

identifying one or more replicas from the first server to move to a second server;

determining the identity of the second server by at least identifying, from the ranking of the plurality of servers in the cluster, a server with a least currently available capacity that is sufficient to host the one or more identified replicas to be moved from the first server; and moving the one or more identified replicas from the first server to the second server.

15. The hardware storage device of claim 14, wherein the second server is determined to be on a different upgrade domain than the first server.

16. The hardware storage device of claim 14, wherein the second server is determined to be on a different fault domain than the first server.

17. The hardware storage device of claim 14, wherein the method further includes:

determining to move a particular replica of the one or more replicas based at least on a cost of moving the particular replica as compared to the cost for moving at least one other replica.

18. The hardware storage device of claim 14, wherein the cost is determined by sizes of replicas.

19. The hardware storage device of claim 14, wherein the cost is determined by at least a number of replicas to move.

20. The hardware storage device of claim 14, wherein the method further includes:

taking a snapshot of a cluster environment, and wherein the method is performed using the snapshot.

* * * * *